April 22, 1958     T. J. DUNN ET AL     2,831,544
VEHICLE WITH SHIFTABLE IMPLEMENT CARRYING TABLE THEREON
Filed March 23, 1954     4 Sheets-Sheet 1

INVENTORS
THOMAS J. DUNN
HERBERT W. DAVIS
BY
McMorrow, Berman + Davidson
ATTORNEYS April 22, 1958   T. J. DUNN ET AL   2,831,544
VEHICLE WITH SHIFTABLE IMPLEMENT CARRYING TABLE THEREON
Filed March 23, 1954   4 Sheets-Sheet 2
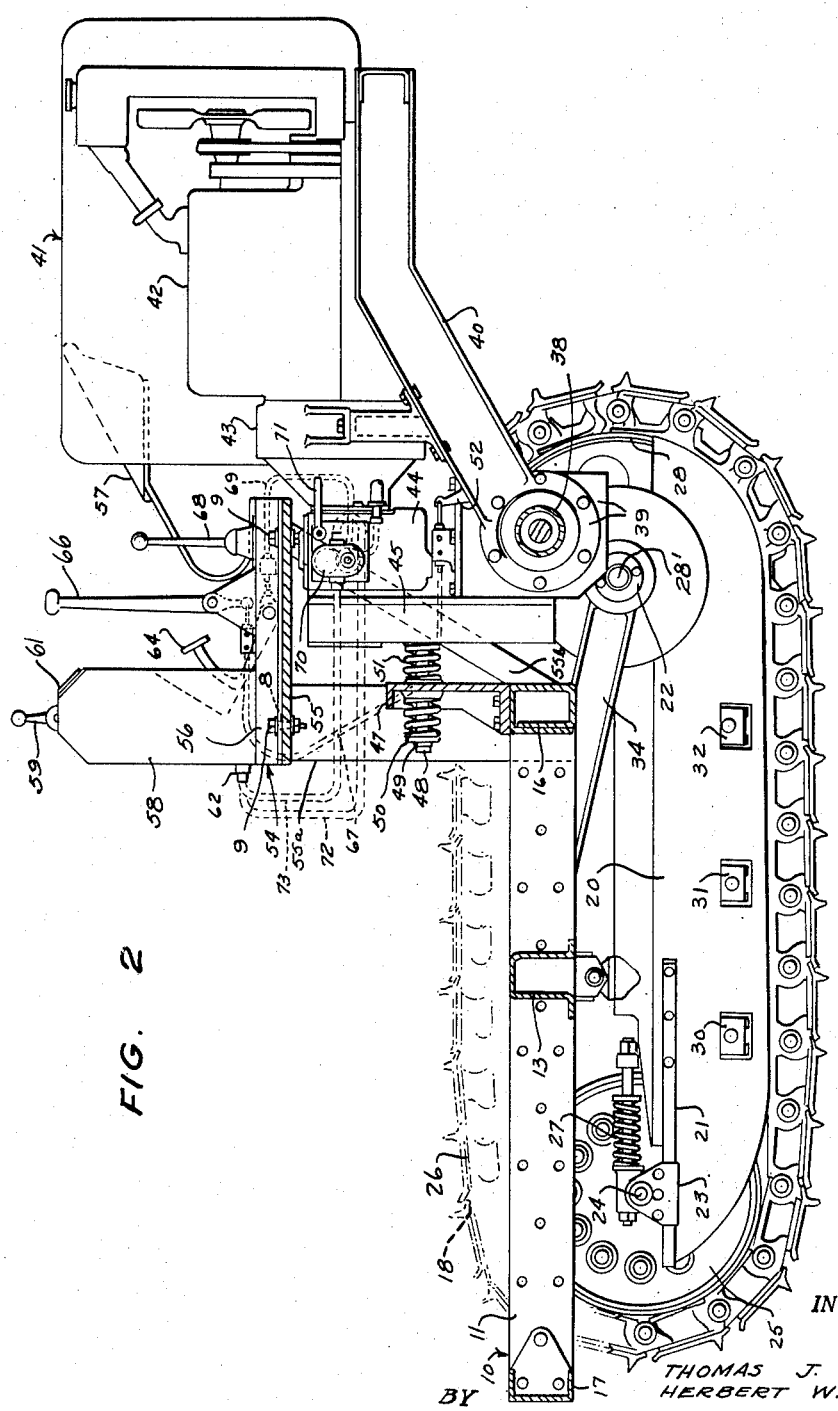
FIG. 2
INVENTORS
THOMAS J. DUNN
HERBERT W. DAVIS
BY
ATTORNEYS

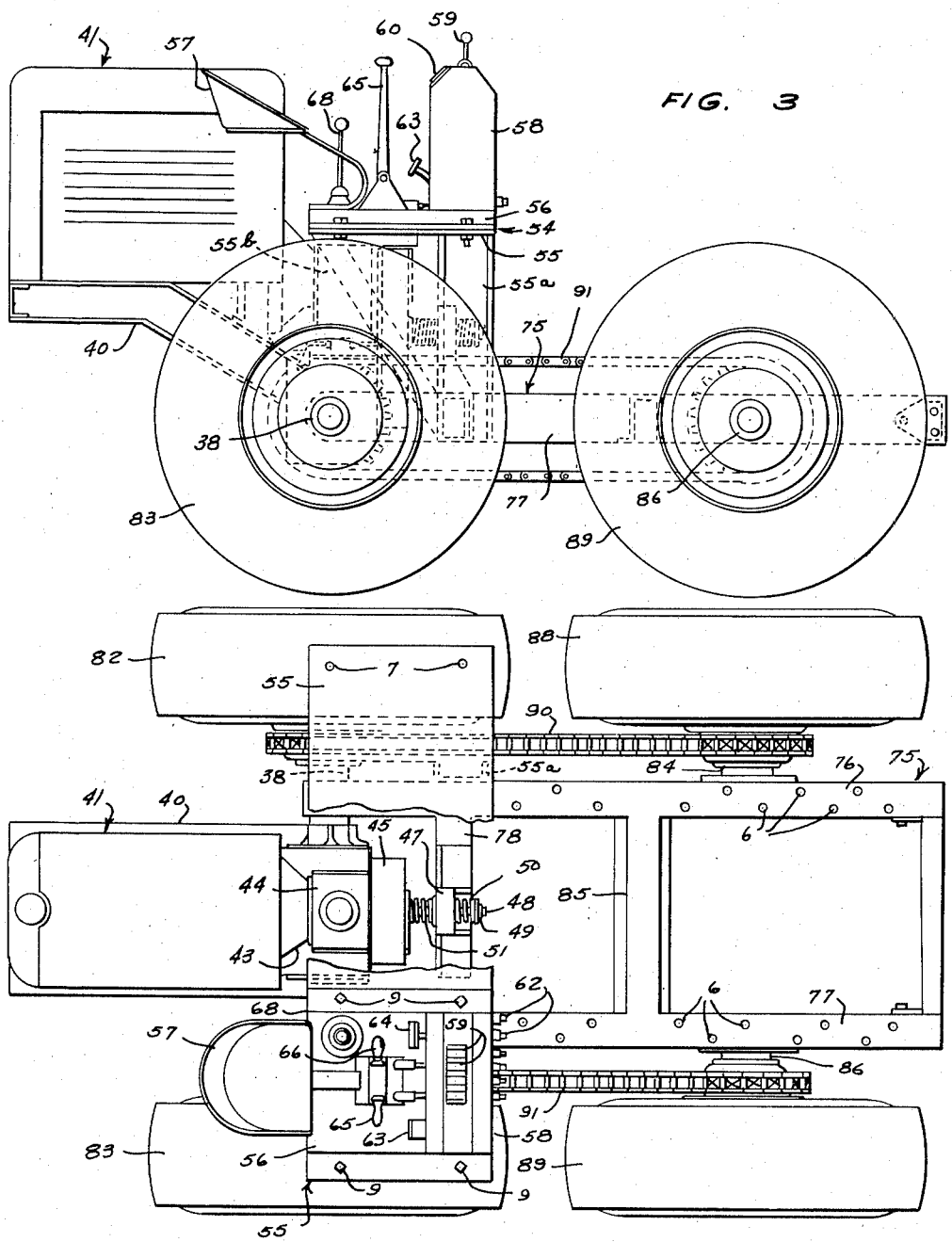

April 22, 1958 T. J. DUNN ET AL 2,831,544
VEHICLE WITH SHIFTABLE IMPLEMENT CARRYING TABLE THEREON
Filed March 23, 1954 4 Sheets-Sheet 4
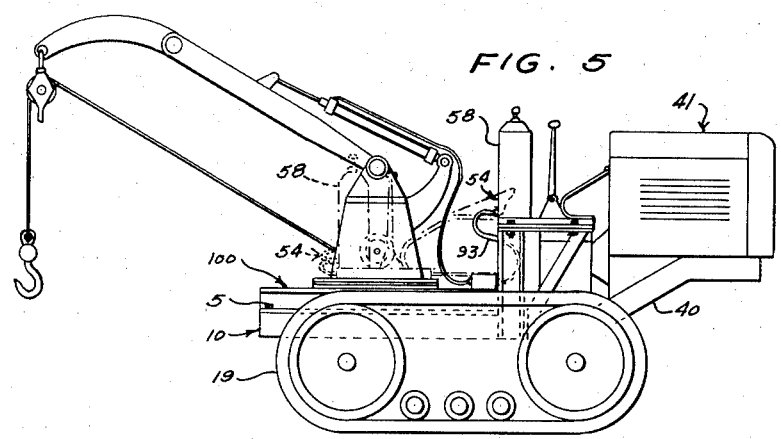
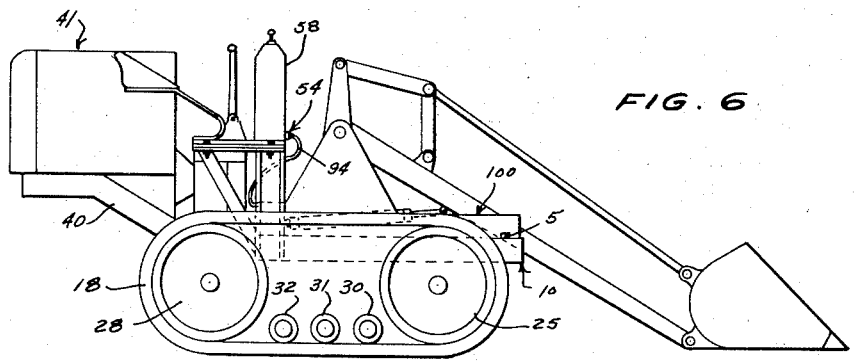
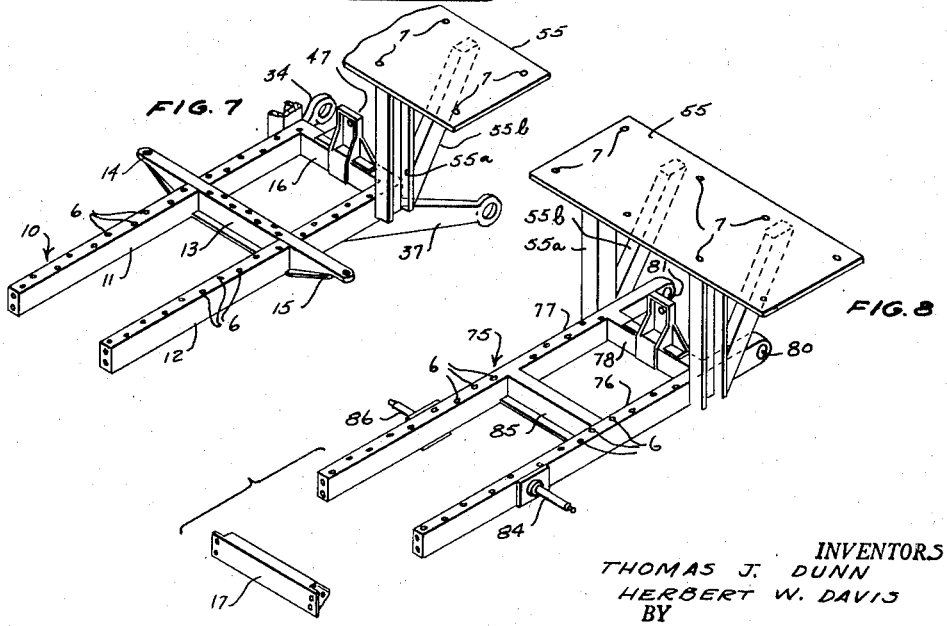
INVENTORS
THOMAS J. DUNN
HERBERT W. DAVIS
BY
McMorrow, Berman + Davidson
ATTORNEYS

United States Patent Office 2,831,544
Patented Apr. 22, 1958

2,831,544

VEHICLE WITH SHIFTABLE IMPLEMENT CARRYING TABLE THEREON

Thomas J. Dunn and Herbert W. Davis, Hackettstown, N. J., assignors, by direct and mesne assignments, to Certified Equipment Corp., New York, N. Y., a corporation of New York Application March 23, 1954, Serial No. 418,003

2 Claims. (Cl. 180—9.1)

This invention relates to a work implement carrying vehicle.

An object of the present invention is to provide a work implement carrying vehicle in which a table carrying a work implement and the actuating mechanism therefor may be selectively connected to the frame of the vehicle.

Another object of the present invention is to provide a work implement carrying vehicle in which a platform carrying a seat for an operator and the control appurtenances for operating the work implement and the traction units may be selectively connected to the frame of the vehicle.

A further object of the present invention is to provide a work implement carrying vehicle in which there is a frame enabling the connection thereto of both a table carrying a work implement and the actuating mechanism therefor and a platform carrying a seat for an operator and the control appurtenances for operating the work implement and the traction units with facility and ease.

A still further object of the present invention is to provide a work implement carrying vehicle which may be assembled and disassembled and which is commercially practical and highly efficient in operation.

Figure 2 is a longitudinal cross sectional view on the line 2—2 of Figure 1.

Figure 3 is a side elevational view of a somewhat modified form of tool carrier.

Figure 4 is a top plan view of the modified form of tool carrier illustrated in Figure 3.

Figure 5 is a somewhat diagrammatic side elevational view of the tool carrier with a power tool operatively mounted thereon.

Figure 6 is a diagrammatic side elevational view of the tool carrier with a power tool of a different character from the tool illustrated in Figure 5 operatively mounted thereon.

Figure 7 is a perspective view of the frame of the tool carrier illustrated in Figures 1 and 2.

Figure 8 is an exploded perspective view of the frame of the modified form of tool carrier illustrated in Figures 3 and 4.

Figure 1:
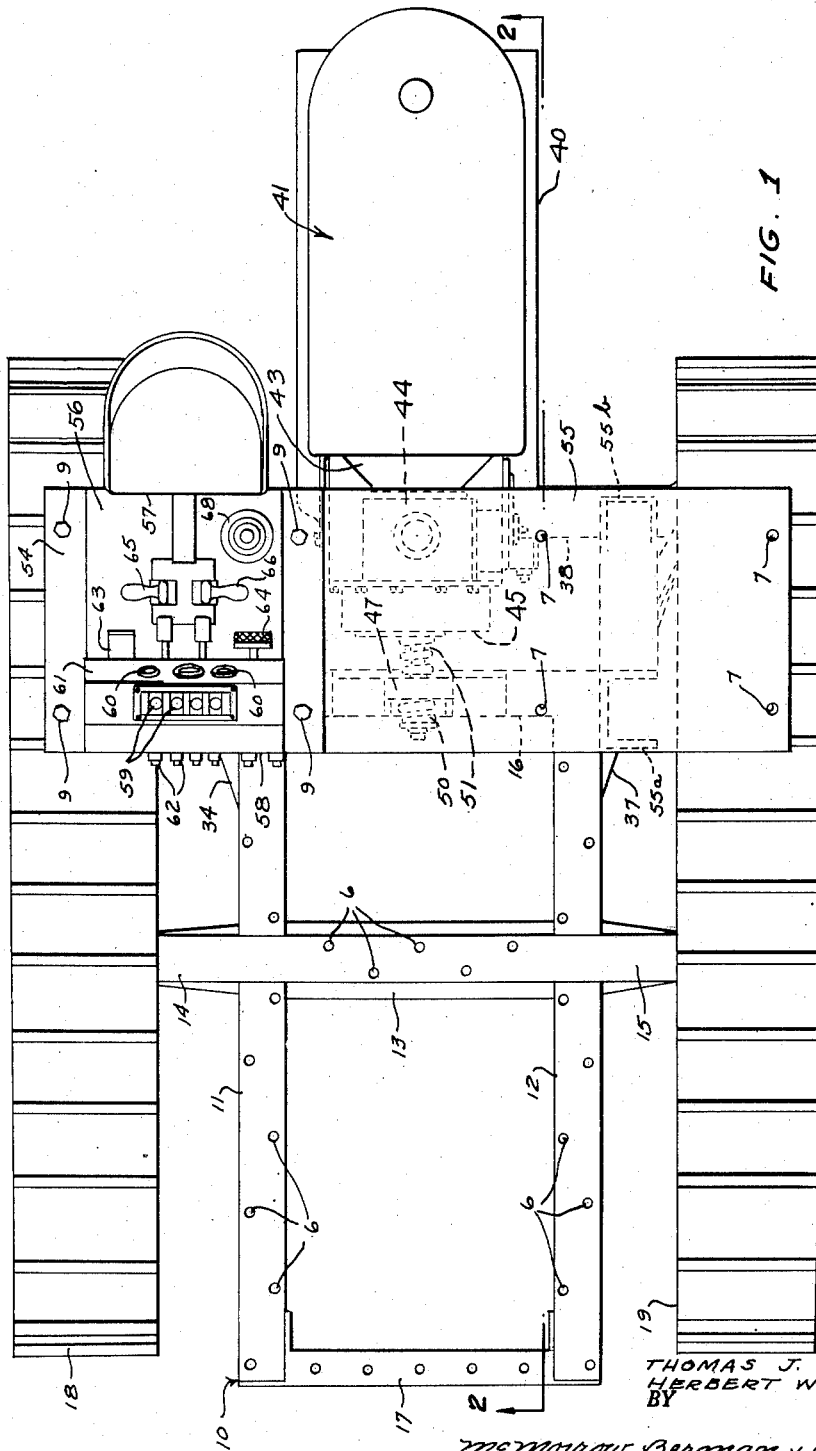
Figure 1 is a top plan view of a self-propelled tool carrier illustrative of the invention.

With continued reference to the drawings, the vehicle, as illustrated in Figures 1 and 2, has a frame, generally indicated at 10, of elongated, rectangular shape including spaced apart and substantially parallel side members 11 and 12 which are preferably of box construction, an intermediate cross member 13 extending transversely of the frame intermediate the length of the side members 11 and 12 substantially perpendicular to the side members and projecting at its ends outwardly of the side members 11 and 12, as indicated at 14 and 15, and a rear cross member 16 extending perpendicularly between the side members 11 and 12 at the rear ends of these side members, and has a temporary front cross member 17 which is connected between the front ends of the side members 11 and 12 to reinforce the frame when there is no table carrying a work implement and actuating mechanism therefor 100, Figures 5 and 6, mounted on the vehicle and which may be removed from the frame when a work implement is mounted on the vehicle, the table then providing sufficient reinforcement for the front end of the frame. When the front cross member 17 is removed, the portions of the side members 11 and 12 in front of the intermediate cross member 13 and the portion of this intermediate cross member between the side members constitutes a fork which is entirely free of obstructions and which can be run under a table carrying the work implement and actuating mechanism therefor particularly designed for mounting on the frame of the vehicle and such table can then be lowered onto or slidably engaged with the frame and rigidly secured thereto. The work implement and actuating mechanism therefor may be a crane, a loader, an excavating shovel, a fork lift, or a soil working device, all having platforms carrying same which are adapted to fit upon the frame of the vehicle and which may be suickly and easily attached to and detached from the vehicle frame.

The frame 10 is supported on a pair of traction units or endless track assemblies 18 and 19 extending longitudinally of and substantially parallel to the frame side members 11 and 12 and spaced respectively from the outer sides of these frame members.

Each of the track assemblies, as illustrated in the case of the track assembly 18 in Figure 2, includes an elongated track carrier 20 having at its front end a longitudinally extending guideway 21 and having at its rear end a bearing formation 22 for the stub axle of the corresponding rear track wheel.

A slide 23 is mounted on the guideway 21 and a stub axle 24 is journaled at one end in the slide or crosshead 23. A track wheel 25 is mounted on the axle 24 and the front end of the jointed, endless track 26 extends around the track wheel 25, a track tensioning spring 27 being connected between the track carrier 20 and the crosshead 23 to maintain the track 26 in a stretched condition. A rear track wheel 28 is mounted on a stub axle 28' journaled in the formation 22 and the rear end of the track 26 extends around the rear track wheel 28. Track roller assemblies, as indicated at 30, 31 and 32, are rotatably mounted on the track carrier 20 near the bottom edge of this carrier and at spaced apart locations therealong to support the carrier on the lower intermediate portion of the track 26 and to reduce the friction of the movement of the track relative to the bottom edge of the carrier 20.

A rearwardly and downwardly inclined strut 34 is secured at one end to the frame side member 11 and at its other end to the rear track wheel journal structure 22 to support the corresponding side of the rear end of the frame 10 on the track carrier 20, and the corresponding end of the intermediate frame cross member 13 is connected to the track carrier 20.

The other track 19 is of the same construction as the track 18, as described above, and supports the corresponding end of the intermediate cross member 13. A strut 37 is secured at one end to the frame side member 12 near the rear end of this side member and is inclined downwardly and rearwardly to a connection at its rearward end with the journal structure of the rear track wheel of the track assembly 19, the struts 34 and 37 being downwardly inclined in a rearward direction, as illustrated in Figure 2.

A rear axle 38 extends transversely of the carrier between the rear track wheels of the track assemblies and is mounted at its respectively opposite ends on the corresponding track carriers. This rear axle includes a power transmitting mechanism 39 of known construction effective to steer the vehicle by selectively driving the tracks, and axle shafts extending from the power transmitting mechanism to the respectively opposite ends of the rear axle and drivingly connected to the rear track wheels, such as the wheel 28. An engine mount 40 is mounted at its front end on the rear axle 38 and is inclined rearwardly and upwardly from the rear axle. A power plant, generally indicated at 41, is mounted on the engine mount 40 and includes an engine 42, such as an internal combustion engine, having at its front end a transmission 44. A change speed transmission 44 is disposed at the front end of the power transmitting mechanism 39 and a power transfer mechanism 45 is disposed at the front side of the clutch mechanism 43 and transfers power delivered from the engine 42 through the clutch mechanism 43 to the transmission mechanism 44 and the power transmitting mechanism 39 of the rear axle of the carrier.

A standard 47 is secured at its lower end to the frame rear cross member 16 symmetrically of the mid-length location of the rear cross member and extends upwardly from the rear cross member of the frame. Near its upper end, the standard 47 is provided with an aperture and a pin 48 is secured at its rear end to the housing of the transfer mechanism 45 and extends through the aperture in the standard 47. A spring abutment 49 is mounted on the front end of the pin 48 and a compression spring 50 surrounds the pin between the abutment 49 and the standard 47, while a similar compression spring 51 surrounds the pin between the standard 47 and the housing of the transfer mechanism 45.

The pin 48 together with the springs 50 and 51 and the standard 47 maintains the power plant 41 in proper operative position relative to the frame 10 and the track assemblies 18 and 19, so that the power plant can supply carrier propelling power to the track assemblies through the rear axle 38 and differential mechanism 39. The vehicle may be steered by means of any one of several known devices associated with the power transfer mechanism 39, the control arm 52 of such a steering means being shown in Figure 2.

It is to be noted that the frame 10 as supported upon the traction units or track assemblies 18 and 19 is unobstructed inwardly from the front end or the end closed by the detachable cross member 17 to a point spaced from its rear end or the end closed by the fixed cross member 16.

A control unit carrying a seat for an operator and the appurtenances for operating the work implement actuating mechanism and the traction units or track assemblies 18 and 19 and designated generally by the numeral 54 is selectively connectible to the portion of the frame 10 adjacent its rear end. As shown in Figures 1, 2 and 7, it is detachably connected to a shelf 55 supported by brackets 55a and braces 55b carried by the side members 11 and 12 of the frame 10 adjacent the rear cross member 16 by means of bolts 9 extending through complemental openings 7 and 8 formed respectively in the shelf 55 and a platform 56 of the control unit 54. Carried by the platform 56 of the control unit are an operator's seat 57 disposed above the rear end thereof, a control box 58 mounted on the front portion of the platform and extending upwardly therefrom, this control box including hydraulic valves and valve operating levers, as indicated at 59, extending upwardly from the top of the box. Indicating instruments 60 are mounted in an instrument panel 61 constituting a rear, upper portion of the control box, and hydraulic conduit fittings 62 project from the lower front portion of the box in association with the valves controlled by the several valve control levers 59. An engine throttle controlling pedal 63 is mounted on the platform 56 near one side of the platform and at the rear of the control box, and a clutch pedal 64 is mounted on the platform near the other side thereof and also at the rear side of the control box 58. Steering levers 65 and 66 extend upwardly from the platform immediately in front of the operator's seat 57 and are connected to the steering mechanism by suitable remote control connectors, as indicated at 67, and a gear shift lever 68 is mounted on and extends upwardly from the platform 56 near the rear, inner corner of the platform. The clutch pedal 64 is connected to the engine clutch 43 by a suitable remote control connector 69, the throttle control pedal 63 is connected to the engine throttle mechanism by a similar remote control, and the gear shift lever 68 is connected to the transmission mechanism 44 by suitable remote control connections, not illustrated. The remote control connections connecting the various control instrumentalities in the control unit to the corresponding components of the power plant have sufficient length and flexibility to permit the control unit to be moved to various positions on the frame or on the associated table carrying a work implement and actuating mechanism therefor and may be mechanical or hydraulic in nature, as may be desired.

An auxiliary power device, such as a hydraulic pump 70 is mounted on the transmission mechanism 44 and driven from a power take off connection of the transmission under control of a power take off clutch lever 71 and the inlet and outlet sides of this pump are connected into the control box 58 by flexible conduits 72 and 73 respectively, to supply hydraulic fluid under pressure to the valves in the control box and receive exhaust fluid therefrom and return the exhaust fluid to the pump. Flexible conduits may be detachably connected to the various hydraulic conduit fittings 62 to connect the pump 70 in any desired manner to a power tool mounted on the carrier frame 10 and the supply of auxiliary power to the power tool can be manually controlled by the valve levers 59 to accomplish a desired operation of the tool. The mobile vehicle thus supplies operating power to the tool, as well as supporting the tool and providing mobility therefor.

In the somewhat modified form of the device illustrated in Figures 3 and 4, the construction is the same as that illustrated in Figures 1 and 2 and described above, except for minor structural changes in the carrier frame and for a change in the traction units, wheels being substituted in the modified form of the invention for the endless track assemblies shown in the form of the invention described above. In the frame 75 of the modified form of the invention, the frame side members 76 and 77, instead of terminating at the rear cross member 78 and having the rearwardly and downwardly inclined struts 34 and 37 connected thereto, are extended rearwardly of the rear cross member and provided near their rear ends with apertures 80 and 81 through which the rear axle 38 extends and in which the rear axle is secured. Pneumatic tired rear wheels 82 and 83 are mounted on the rear axle 38 at the respectively opposite ends thereof and are driven from the associated power plant through the corresponding clutch, transmission, transfer mechanism and rear axle differential, in the same manner that the rear track wheels of the first described form of the invention are driven. A stub axle 84 is secured to the frame side member 76 between the intermediate cross member 85 and the front end of the frame and projects perpendicularly outwardly from the outer side of the side member 76. A similar stub axle 86 is secured to the frame side member 77 between the intermediate cross member 85 and the front end of this side member and projects perpendicularly outwardly from the outer side of the frame side member 77. Pneumatic tired wheels 88 and 89 of large size are journaled on the stub axles 84 and 86 respectively. Each of the wheels is provided at its inner side with a chain sprocket and an endless chain 90 trained over the sprockets carried by the wheels 82 and 88 drivingly connects the rear wheel 82 to the corresponding front wheel 88, and a similar endless chain 91 trained over the chain sprockets carried by the wheels 83 and 89 drivingly connects the rear wheel 83 to the corresponding front wheel 89. This modified carrier is steered by a suitable steering mechanism in the same manner as the track type carrier described above, and all other parts of the modified form of carrier are the same as the corresponding parts of the track type carrier, and are designated by the same reference numerals.

In Figure 5, a table carrying a work implement and the actuating mechanism therefor designated by the numeral 100 or power crane is shown connected to the frame 10 of the work implement carrying vehicle and having hydraulic operating mechanism connected to the fittings 62 of the control unit or platform 56 carrying the operator's seat and control appurtenances by flexible hose connections, as indicated at 93, and a position of the control unit on the base of the crane is shown in dotted lines, the power crane being detachably connected to the unobstructed portion of the frame 10 by means of bolts 5 extending through complemental holes 6 in the side members 11 and 12 of the frame 10 and in holes formed in the table carrying the crane. In Figure 6, the table carrying a work implement and the actuating mechanism therefor is in the form of a power operated loader, the loader being shown detachably connected to the unobstructed portion of the frame 10 by means of bolts 5 extending through complemental holes 6 in the side members 11 and 12 of the frame 10 and in holes formed in the table carrying the loader, the hydraulic operating mechanism being connected to the vehicle fittings by flexible conduits, as indicated at 94. Various other tables carrying a work implement and the actuating mechanism therefor can be similarly mounted on the unobstructed portions of either of the frames 10 or 75.

The invention may be embodied in other specific forms without departing from the spirit or essential characteristics thereof. The present embodiments are, therefor, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a work implement carrying vehicle, a pair of traction units, a horizontally disposed frame extending longitudinally of and carried by said units, said frame including spaced side members and being unobstructed inwardly from its front end to a point spaced from its rear end, a shelf adjacent the rear end of said frame and carried by the latter, a table carrying a work implement and the actuating mechanism therefore, said table being slidable along the unobstructed portion of said side members, means formed on said table selectively registrable with complemental means formed on said side members responsive to sliding movement of said table along the unobstructed portion of said side members, detachable fastening elements extending through the registering complemental means of said side members and said table for securing said work implement carrying table at a selected position of movement to said frame, a platform carrying a seat for an operator and the control appurtenances for operating the traction units and actuating mechanism of a work implement, said platform being positioned upon said shelf, means formed on said platform registrable with complemental means formed on said shelf, detachable fastening elements extending through the registering complemental means on said shelf and platform for securing said platform to said shelf, said work implement actuating mechanism being detachably connectible to the control appurtenances on said platform.

2. In a work implement carrying vehicle, a pair of traction units, a horizontally disposed frame including spaced side members connected by a cross member at the rear ends of said members and by a detachable cross member at the front ends of said members disposed longitudinally of and carried by said traction units, said side members of said frame being unobstructed inwardly from the front ends to a point spaced from the rear ends, a shelf adjacent the rear ends of said side members and carried by said frame, a table carrying a work implement and the actuating mechanism therefor, said table being slidable along the unobstructed portion of said side members, means formed on said table selectively registrable with complemental means formed on said side members responsive to sliding movement of said table along the unobstructed portion of said side members, detachable fastening elements extending through the registering complemental means of said side members and said table for securing said work implement carrying table at a selected position of movement to said frame, a platform carrying a seat for an operator and the control appurtenances for operating the traction units and actuating mechanism of a work implement said platform begin positioned upon said shelf, means formed on said platform registrable with the complemental means formed on said shelf, detachable fastening elements extending through the registering complemental means on said shelf and platform for securing said platform to said shelf, said work implement actuating mechanism being detachably connectible to the control appurtenances on said platform.

References Cited in the file of this patent

UNITED STATES PATENTS

| 924,820 | Parrish | June 15, 1909 |
| 1,337,400 | Garson | Apr. 20, 1920 |
| 1,773,252 | Bager | Aug. 19, 1930 |
| 1,801,735 | Glatt | Apr. 21, 1931 |
| 1,881,748 | Ljungkull | Oct. 11, 1932 |
| 1,887,553 | Hamre | Nov. 15, 1932 |
| 1,933,873 | Osman | Nov. 7, 1933 |
| 2,157,711 | Lamb | May 9, 1939 |
| 2,319,486 | Austin | May 18, 1943 |
| 2,409,552 | Donnellan | Oct. 15, 1946 |
| 2,559,733 | Pitman et al. | July 10, 1951 |
| 2,599,170 | Franks | June 3, 1952 |
| 2,602,552 | Orloff | July 8, 1952 |